United States Patent
Stewart

[11] 3,980,391
[45] Sept. 14, 1976

[54] OPTICAL FIBER TRANSMISSION COMPENSATOR

[75] Inventor: William James Stewart, Towcester, England

[73] Assignee: Plessey Handel und Investments A.G., Zug, Switzerland

[22] Filed: Apr. 17, 1975

[21] Appl. No.: 568,822

[30] Foreign Application Priority Data
May 7, 1974  United Kingdom............... 19968/74

[52] U.S. Cl. .......................... 350/96 C; 350/96 GN; 350/175 GN
[51] Int. Cl.² .......................................... G02B 5/14
[58] Field of Search ....... 350/96 C, 96 WG, 96 GN, 350/175 GN

[56] References Cited
UNITED STATES PATENTS

| | | | |
|---|---|---|---|
| 3,687,514 | 8/1972 | Miller et al.................... | 350/96 WG |
| 3,759,590 | 9/1973 | Arnaud ........................ | 350/96 WG |
| 3,829,195 | 8/1974 | Rawson........................ | 350/96 WG |
| 3,831,038 | 8/1974 | Dabby et al.................. | 350/96 WG |
| 3,832,030 | 8/1974 | Gloge........................... | 350/96 C |

*Primary Examiner*—John K. Corbin
*Assistant Examiner*—Stewart Levy
*Attorney, Agent, or Firm*—Fleit & Jacobson

[57] ABSTRACT

In an optical fiber, light energy is transmitted in a number of modes having characteristic group velocities, and it is frequently necessary to limit transmission to modes whose group velocities are not excessively disparate. The invention avoids this limitation by providing a compensator (preferably) midway between two stations. The compensator pairs a fast mode in a fiber leading to one of the stations with a slow mode in a fiber leading to the other station, so that the group velocities for all pairs are approximately equal. The compensator comprises first, second and third focusing systems which are aligned with the fiber ends.

The first system focuses energy received from one fiber into concentric rings whose radii are characteristic of the modes used in the fiber. The second system transposes, to a ring of maximum radius, energy focused at a ring of minimum radius, and vice versa. The third system delivers transposed energy to the other fiber in modes determined by the radii of the rings to which the energy has been transposed.

1 Claim, 6 Drawing Figures

OPTICAL FIBER TRANSMISSION COMPENSATOR

This invention relates to the transmission of energy by optical fiber.

When an optical fiber transmits energy, the energy follows a number of zig-zag paths which cross the fiber axis at different angles. A group of paths which cross the axis at the same angle as each other is known as a mode. The velocity with which energy is carried by a mode from one fiber end to the other is known as the group velocity. On account of the different lengths of the zig-zag paths, each mode has its characteristic group velocity, the group velocity of a mode being a function of the angle at which the paths of the mode cross the fiber axis. The different group velocities of the different modes give rise to difficulties at a station which receives energy transmitted over an optical fiber. It is necessary to limit the modes employed for transmission purposes to those whose group velocities are compatible with the equipment at the receiving station. In order to avoid the need for complicated equipment, it is often necessary to limit the number of modes used. Consequently it frequently happens that the transmission capacity of an optical fiber is not fully exploited.

According to the invention there is provided an optical fiber transmission compensator responsive to energy received from a first optical fiber in a number of modes having characteristic group velocities ranging progressively from a minimum to a maximum value, to deliver the received energy to a second optical fiber in the said number of modes, the energy received from the first fiber in modes increasing from the minimum to the maximum characteristic group velocities being delivered to the second fiber in modes decreasing respectively from the maximum to the minimum characteristic group velocities.

The compensator mentioned in the previous paragraph comprises three focusing systems. The first focusing system focuses energy received from the first fiber into concentric rings whose radii are determined by the angles which characterise the modes in which the energy was received. The second focusing system transposes, to a ring of maximum radius, energy focused at a ring of minimum radius, and vice versa. The third focusing system delivers transposed energy to the second fiber at angles which are determined by the radii of the rings to which the energy was transposed. The focusing may be performed by lenses or by lengths of optical fiber whose refractive index varies with the core radius. By means of a compensator, energy which is transmitted by a fast mode in the first fiber, is transposed to a slow mode in the second fiber, and vice versa. By pairing modes in this way, energy is transmitted over the combined length of the two fiber with an overall group velocity which is the same for each pair of modes.

The invention will now be described with reference to the accompanying drawings in which.

Figure 1:
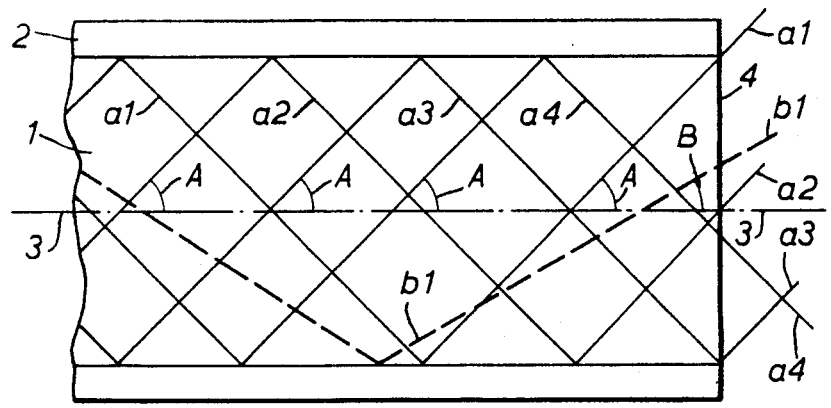
FIG. 1 is a sectional view of an end of an optical fiber illustrating how energy is known to be transmitted along the fiber.

The optical fiber shown in FIG. 1 comprises a core 1 enclosed by a cladding 2, the longitudinal centre line of the fiber being shown at 3. The fiber terminates at a transverse surface 4. Energy is transmitted along the fiber, by total internal reflection, in a number of modes. Each mode constitutes a group of zig-zag paths which cross the fiber axis 3 at an angle which is the same for all the paths in the group. Thus the paths $a1-a4$ all cross the fiber axis at the angle A. The paths retain this angle on emergence from the surface 4. The rays $a1$, $a2$, $a3$ are shown emerging from the top, centre and bottom respectively of the surface 4 and proceed upwardly in relation to the axis 3. The path $a4$ emerges downwardly from an intermediate point in the surface 4. The point and direction of emergence of a path are fortuitous, depending on the position along the length of the fiber at which the surface 4 is cut. The paths $a1-a4$, together with all other paths which cross the axis 3 at the angle A, form a group of paths which constitute a mode A. A path $b1$ is shown as typical of paths which cross the axis at an angle B, and together constitute a mode B. Each mode transmits energy from end to end of the fiber with a different velocity known, in respect of each mode, as the group velocity. The group velocity of a mode is a function of the angle at which the axis 3 is crossed by the paths which constitute the mode. When energy is transmitted along an optical fiber, it is frequently necessary to limit the number of modes used, so that the difference between the highest and lowest group velocities is kept within acceptable limits. As a result, a number of modes are idle, and the transmission capacity of the fiber is not fully exploited. Compensators as herein disclosed permit a much fuller exploitation of the transmission capacity.

A compensator is placed at an intermediate point between a transmitting station and a receiving station, and is connected to each by an optical fiber. Preferably the compensator is placed midway between the two stations, and the fiber connecting the compensator to the two stations are identical. These conditions, permit a symmetrical design for the compensator. Since the conditions are easily obtained in practice, the following discussion assumes their existence.

Figure 2:
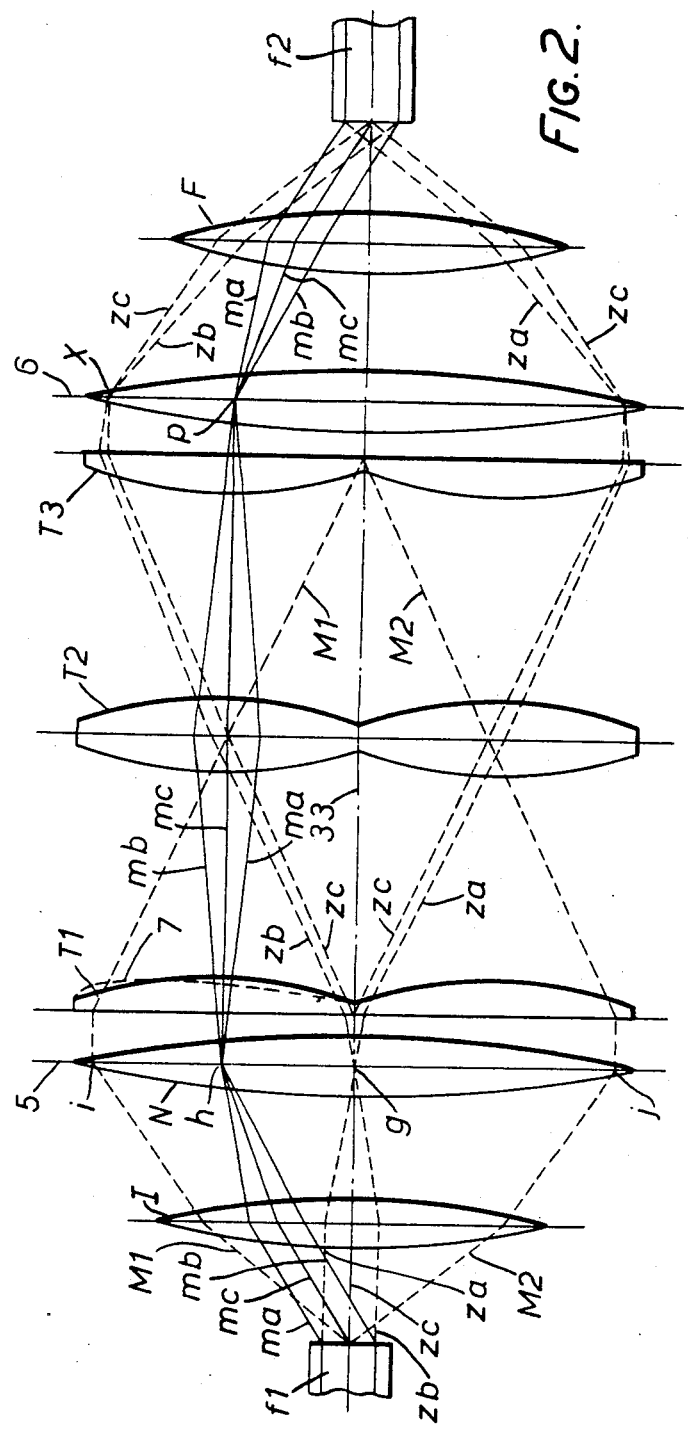
FIG. 2 is a diagram illustrating a first embodiment of the invention.

The compensator shown in FIG. 2 is connected to a transmitting station (not shown) by a first optical fiber whose end is shown at $f1$, and to a receiving station (not shown) by a second optical fiber whose end is shown at $f2$. The ends of the fiber are placed in register with each other, as shown by the common axis 33. Energy is received from the first fiber $f1$ in a number of modes, each having a characteristic group velocity, and each comprising paths which cross the axis 33 at a characteristic angle. Three modes are shown, namely those which have the minimum, middle and maximum values of the range of characteristic angles appropriate to the modes in use. The minimum angle is assumed to be zero. The paths constituting this mode, therefore, run parallel to the axis 33 on emergence from the fiber $f1$. This mode is depicted by three paths $za$, $zb$, $zc$. The paths $za$, $zb$ emerge respectively from the top and bottom of the fiber end $f1$. The path $zc$ coincides, on emergence, with the axis 33. The mode represented by the mid-angle of the range, is depicted by the three parallel paths $ma$, $mb$, $mc$, of which the paths $ma$, $mb$ emerge respectively from the top and bottom of the fiber end $f1$, and the path $mc$ emerges from the centre. The mode represented by the maximum angle of the range is depicted (for simplicity) by two paths M1, M2, which both emerge from the centre of the fiber $f1$. The paths, having emerged from the fiber $f1$, will now be referred to as rays, to accord with accepted convention.

At this stage, it is desirable to emphasise that FIG. 2 has not been drawn to scale, a certain amount of distortion having been introduced to allow the rays to be traced individually. The distortion is particularly noticeable in respect of the lenses I, F which in reality are positioned close to the fiber-ends $f1$, $f2$ respectively.

An initial lens I is placed close to the fiber end $f1$. The emergent parallel rays, in respect of any mode, fall on the lens I, which brings them to a focus at a plane 5 which is perpendicular to the axis 33. Three foci $g$, $h$, $i$ are shown in relation to the rays $za$–$zc$, $ma$–$mc$, M1 respectively. A fourth focus $j$ is shown in relation to the ray M2. The focus $g$ lies at the intersection of the axis 33 and the plane 5. The focus $h$ is spaced from the axis 33 by a distance $gh$. The distance $gh$ is dependent on the angle at which the ray $mc$ cuts the axis 33 — the middle value of the range of characteristic angles in use — and the optical properties of the lens I. Likewise, the distance from the point $g$ to the focus $i$ is dependent on the value of the highest characteristic angle in use, as evidenced by the ray M1. A focus $j$ is also formed in the plane 5 in respect of the ray M2. The distance $gj$ is equal to the distance $gi$. The rays shown in the view of FIG. 2 have their counterparts in all other planes that contain the axis 33. Consequently the foci $i$, $j$ are in reality two different points on a ring of radius $gi$. Similarly, the rays in respect of the middle-angle mode come to a focus in the plane 5 at a ring of radius $gh$. At the focus $g$, the radius of the ring is zero.

Figure 3:
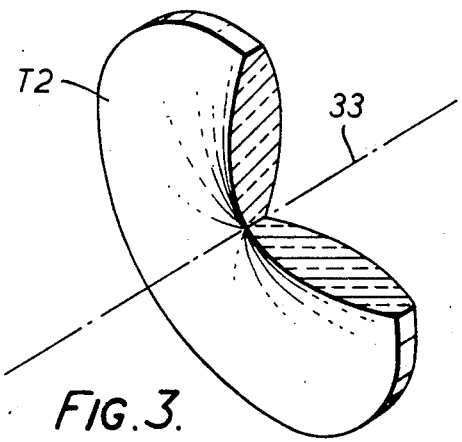
FIG. 3 is a perspective cut-away drawing of a lens used in the embodiment of FIG. 2.

In the plane 5 lies an entrance lens N. The function of the entrance lens N is, in respect of each mode, to forward the rays emanating from centre of the fiber end $f1$ in a direction parallel to the axis 33. The entrance lens N gives entrance to a succession of three transposing lenses T1, T2, T3, which is followed by an exit lens X. The exit lens X is identical with the entrance lens N, and lies in a plane 6 which is parallel to the plane 5. The central ray $mc$ of the middle-angle mode passes undeflected through the transposing lenses T1–T3, and cuts the plane 6 at a point $p$ which is spaced from the axis 33 by a distance equal to the radius $gh$. In order that the ray $mc$ may pass undeflected through the lenses T1–T3 these lenses must have their greatest thickness at the line which the ray follows. And in order that the lenses may offer a transposing action, the lenses are symmetrical about this line. This requirement results in the lenses having a dimpled profile due to the thickness being at a minimum at the periphery and at the centre. The lenses T1, T3, which are identical, have one plane face and one face with a dimpled profile. Both profiles of the lens T2 are dimpled, as shown in FIG. 3. The lens T2 is situated midway between the lenses T1, T3. The lenses T1–T3 together have a transposing action, as illustrated by the ray $zc$, which passes through the entrance lens N coincident with the axis 33, and arrives at the exit lens X at a distance from the axis 33 that is equal to the maximum radius $gi$. Likewise, the rays M1, M2, which leave the entrance lens N at the maximum radius $gi$, are coincident with the axis 33 when they arrive at the exit lens X. A final lens F, which is identical with the initial lens I, is positioned between the exit lens X and the end of the second fiber $f2$. The function of the final lens F is to refract the rays received from the exit lens X so that the rays relating to any one mode are parallel to each other when they are directed on to the fiber end. Once in the fiber $f2$, the rays follow the well known zig-zag paths.

The compensator is symmetrical about the axis 33 and about the lens T2. The initial I, entrance N, exit X, final F, and the two transposing T1, T3 lenses all have the same focal length. The focal length of the lens T2 is half that of the lenses just mentioned. The earlier remarks on the distortion present in FIG. 2 will be recalled, particularly in relation to the positions of the initial I and final F lenses.

When energy is being transmitted from a transmitting station to a receiving station, the compensator is situated midway between the stations, and is connected to the stations by equal lengths of identical optical fiber. Energy, carried by a mode of minimum characteristic angle in the first fiber, is transposed by the compensator to a mode of maximum characteristic angle in the second fiber. And energy, carried by a mode of maximum characteristic angle in the first fiber, is transposed by the compensator to a mode of minimum characteristic angle in the second fiber. Since the group velocity of a mode is an inverse function of the characteristic angle, the compensator serves to pair a fast mode in the first fiber with a slow mode in the second fiber, and to pair a slow mode in the first fiber with a fast mode in the second fiber. Consequently, energy is transmitted from the transmitting station to the receiving station over pairs of modes — a pair comprising one mode in each fiber — the effect of the compensator being that the overall station-to-station group velocity of any pair of modes approximates to that of any other pair of modes. The pairing of modes, which is achieved by the compensator, permits the use of more modes in each fiber than would be the case without a compensator.

In the compensator just described, the transposing action is symmetrical about the mode whose characteristic angle has the middle of the range of characteristic angles in use. If this mode also had the middle value of the range of group velocities in use, the pairing achieved by the compensator would give a station-to-station group velocity which would be exactly the same for each pair. Unfortunately, the relationship between the group velocity of a mode and its characteristic angle is not so straightforward. The mode of middle group velocity has a characteristic angle greater than the middle value of the range of angles. If the compensation afforded by the compensator is to be related to this mode, the transposing lenses T1–T3 must have their greatest thickness at a distance from the axis 33 which is correspondingly greater than the distance $gh$. A profile which meets this requirement is shown by a broken line 7 in respect of the upper part of the lens T1. However, with the techniques at present available, lenses with this profile are difficult to produce.

Figure 4:
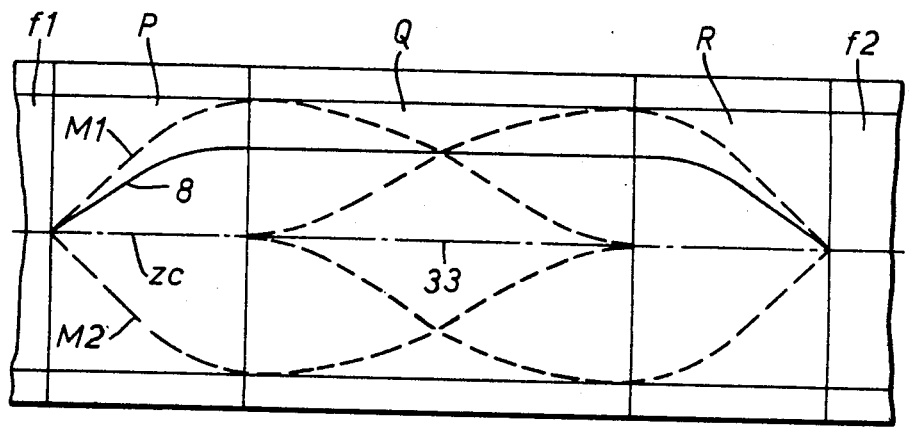
FIG. 4 is a diagram illustrating a second embodiment of the invention.
Figures 5A, 5B:
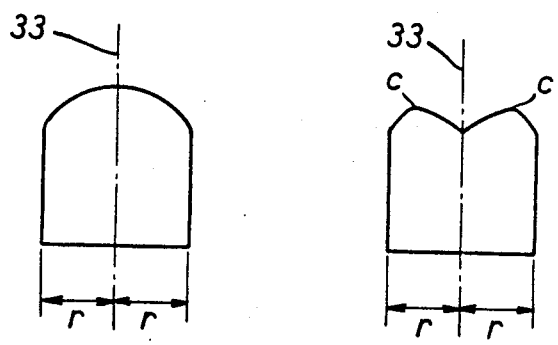
FIGS. 5a, 5b are diagrams showing the relationship between core radius and refractive index in pieces of optical fiber used in the embodiment of FIG. 4.

The difficulties mentioned in the previous paragraph can be overcome by means of a second embodiment of the invention, in which lenses are replaced by pieces of optical fiber having a core whose refractive index varies with the radius. The second embodiment is shown in FIG. 4, and, once again, the ends of the fiber $f1$, $f2$ are placed in register along the common axis 33. Between the fiber ends are placed three pieces P, Q, R of optical fiber. In each piece the radius of the core is the same as that of the cores of the fiber $f1$, $f2$. The pieces P, R are identical, and are noteworthy in that the refractive index of the core decreases as the radius r of the core increases, as illustrated in FIG. 5a. The piece P is placed against and in register with the fiber f1, and the piece R is placed against and in register with the fiber f2. The piece Q is placed between, in contact with and in register with the pieces P, R. In the piece Q, however, the refractive index of the core increases as the radius of the core increases until a change-point c is reached which is more than half way towards the circumference. From the change-point c onwards, the refractive index decreases as the radius r of the core continues to increase. This is illustrated in FIG. 5b.

The piece P performs the focusing function effected by the initial I and entrance N lenses of FIG. 2. As a path approaches the core periphery, the changing refractive index produces a twisting of the path. If an appropriate value is chosen for the length of the piece P in relation to the changes in refractive index, the imparted twisting action causes the central rays of each mode to run parallel to the axis 33 on completion of their travel through the piece P. This is shown in FIG. 4 at M1, M2 in respect of the central paths of the mode which has the maximum characteristic angle, and consequently the minimum group velocity. The central path zc of the mode of minimum (zero) characteristic angle, and maximum group velocity, coincides with the axis 33. The central path of the mode whose group velocity is at the middle of the range used, is shown at 8. As already explained, this is a different mode from the mode having the middle value of characteristic angle, whose central ray (or path) is shown at mc in FIG. 2. The characteristic angle of the mode of middle group velocity is greater than the middle value of the range of characteristic values. Therefore, when the path 8 has been twisted so as to run parallel with the axis 33, the path 8 lies more than half way from the axis 33 to the core periphery.

The piece Q performs the transposing function effected by the transposing lenses T1–T3 of FIG. 2. But whereas the transposing function of the lenses is effected in relation to the mode of middle-angle (whose central ray is shown at mc), the transposing function of the piece Q is effected in relation to the mode of middle group velocity (whose central path is shown at 8). This is achieved by arranging for the path 8 to pass undeflected through the piece Q. To make this arrangement possible, the distance between the axis 33 and the part of the path 8 running parallel to the axis, is made equal to the distance between the axis 33 and the change-point c (FIG. 5) in the refractive index profile of the core of the piece Q. In other words, the path 8 and the change-point c are coincident from end to end of the piece Q. The length of the piece Q is chosen in relation to the changes in refractive index so that the imparted twisting action causes the desired transposition of the paths. Thus the paths M1, M2 which enter the piece Q at maximum radius, leave the piece Q coincident with the axis 33; and the path zc which enters the piece Q at minimum radius, leaves the piece Q at maximum radius.

The piece R performs the function of the exit X and final F lenses of FIG. 2. Compared to the piece P, the piece R acts in reverse. Paths, which enter the piece R parallel to the axis 33 and at different radii, leave the piece R at angles which are dependent on the radii.

The foregoing discussion has assumed that the fiber f1, f2 have the same physical dimensions and optical characteristics as each other. Compensators can be designed to cater for other conditions.

It is to be understood that the foregoing description of specific examples of this invention is made by way of example only and is not to be considered as a limitation in its scope.

What is claimed is:

1. An optical fiber transmission compensator responsive to energy received from a first optical fiber in a number of modes having characteristic group velocities ranging progressively from a minimum to a maximum value, to deliver the received energy to a second optical fiber in the said number of modes, wherein the ends of said first and second optical fibers are in register with each other along a common axis, the energy received from the first fiber in modes increasing from the minimum to the maximum characteristic group velocities being delivered to the second fiber in modes decreasing respectively from the maximum to the minimum characteristic group velocities, wherein the compensator comprises, a. first, second and third focusing systems symmetrical about the said common axis, the first focusing system being adjacent to the first fiber end, the third focusing system being adjacent to the second fiber end, the second focusing system being positioned between the first and third systems, said first, second and third focusing systems comprising respectively first, second and third pieces of optical fiber disposed along said axis;

b. the first piece of optical fiber focuses energy received from the first fiber into concentric rings, whose radii, measured from the said axis, are dependent upon characteristic angles indicative of the group velocity characterizing the modes in which the energy is received, wherein the first piece of optical fiber has a core whose refractive index decreases as the radius increases, the length of the piece being related to the spatial rate of decrease of refractive index so that energy received from the first fiber is focused into said concentric rings;

c. the second piece of optical fiber transposes energy focused at a ring of minimum radius to a ring of maximum radius and vice versa, the transposition of energy being symmetrical about a mode having a group velocity equal to the mid-value of the range of group velocities characterizing the modes in which the energy is received, wherein the second piece of optical fiber has a core whose refractive index increases as the radius increases, until a change-point is reached, after which the refractive index decreases with further increases in radius, the change-point being spaced from said axis by a distance equal to the radius of the ring at which is focused the energy of the mode whose group velocity has the mid-value of the range of group velocities characterizing the modes in which energy is received at the compensator from the first fiber, and the length of the piece being related to the spatial rate of change of refractive index;

d. the third piece of optical fiber delivers transposed energy to the second fiber at angles which are dependent on the radii of the rings to which the energy was transposed by the second piece of optical fiber, wherein the third piece of optical fiber is identical to the first piece of optical fiber.

* * * * *